US008510318B2

(12) United States Patent
Jung (10) Patent No.: US 8,510,318 B2
(45) Date of Patent: Aug. 13, 2013

(54) DATA PROCESSING APPARATUS AND DATA PROCESSING METHOD

(75) Inventor: Joo-young Jung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 711 days.

(21) Appl. No.: 12/139,666

(22) Filed: Jun. 16, 2008

(65) Prior Publication Data

US 2009/0006485 A1 Jan. 1, 2009

(30) Foreign Application Priority Data

Jun. 26, 2007 (KR) ........................ 10-2007-0063150

(51) Int. Cl.
*G06F 17/00* (2006.01)
(52) U.S. Cl.
USPC ........................................... 707/756; 382/239
(58) Field of Classification Search
USPC ................ 707/752–759; 382/232–239
See application file for complete search history.

(56) References Cited

U.S. PATENT DOCUMENTS

| 5,689,695 | A | * | 11/1997 | Read ............................. 712/234 |
| 5,864,716 | A | * | 1/1999 | Wishneusky ................... 710/68 |
| 6,040,873 | A | * | 3/2000 | Izumi et al. ................... 348/559 |
| 7,304,756 | B2 | * | 12/2007 | Hisatake et al. ............. 358/1.15 |
| 7,397,959 | B1 | * | 7/2008 | Volkoff et al. ................ 382/233 |
| 7,453,889 | B2 | * | 11/2008 | Mundra et al. ................ 370/400 |
| 2002/0021802 | A1 | * | 2/2002 | Muratani et al. ................ 380/29 |
| 2002/0063792 | A1 | * | 5/2002 | Speed et al. ............... 348/416.1 |
| 2003/0021346 | A1 | * | 1/2003 | Bixby et al. ............. 375/240.25 |
| 2003/0185301 | A1 | * | 10/2003 | Abrams et al. ........... 375/240.12 |
| 2003/0187634 | A1 | * | 10/2003 | Li ............................... 704/200.1 |
| 2004/0030856 | A1 | * | 2/2004 | Qureshi et al. ............... 711/202 |
| 2004/0146205 | A1 | * | 7/2004 | Becker et al. ................ 382/232 |
| 2005/0086452 | A1 | * | 4/2005 | Ross ............................... 712/34 |
| 2006/0125876 | A1 | * | 6/2006 | Walmsley et al. ............. 347/40 |
| 2006/0265563 | A1 | * | 11/2006 | Goettfert et al. ............. 711/164 |
| 2007/0041652 | A1 | * | 2/2007 | Budge et al. ................. 382/239 |

OTHER PUBLICATIONS

Dictionary of Computer Science, Engineering, and Technology, CRC Press, pp. 159, 275, 319, copyright 2001.*
Microsoft Computer Dictionary, Microsoft Press, definitions of Bytes and Binary etc, 3rd edition, 1997.*

* cited by examiner

*Primary Examiner* — Wilson Lee
(74) *Attorney, Agent, or Firm* — Stanzione & Kim, LLP

(57) ABSTRACT

A data processing apparatus and a data processing method include reading order information included in a data file according to one of a pair of byte orders, comparing the read order information with preset reference information, and decoding the data file if the order information is equal to the reference information.

22 Claims, 8 Drawing Sheets

DATA PROCESSING APPARATUS AND DATA PROCESSING METHOD

CROSS-REFERENCE TO RELATED APPLICATIONS

This application claims priority under 35 U.S.C. §119(a) from Korean Patent Application No. 10-2007-0063150, filed on Jun. 26, 2007 in the Korean Intellectual Property Office, the disclosure of which is incorporated herein in its entirety by reference.

BACKGROUND OF THE INVENTION

1. Field of the Invention

The present general inventive concept relates to a data processing apparatus and a data processing method, and more particularly, to a data processing apparatus and a data processing method which processes data files written in various byte orders.

2. Description of the Related Art

A data processing apparatus (hereinafter, to be called "system") which has a general purpose computer system such as a PC and an embedded system such as a printer, includes a computer memory to store data therein, and a computer processor to read the data stored in the computer memory, process the read data or write the processed data to the computer memory.

Typically, the computer processor writes the data in the computer memory in byte unit (e.g. 2 bytes in a case of 16 bits). The order (hereinafter, to be called "byte order") of writing the bytes of the data at an address of the computer memory is predetermined. The byte order may be classified into big-endian and little-endian. In the big-endian byte order, the computer processor encodes and stores data in the computer memory from its most significant bit. In the little-endian byte order, the computer processor encodes and stores data in the computer memory from its least significant bit.

Such byte order is the property of the computer processor, and may not be mattered if programmed in a single system. The byte order is, however, an important subject in network programming of two computer systems communicating with different byte orders with each other.

To solve the foregoing problem, the conventional invention designates the byte order to be used as the format of the data file, or notifies the byte order used to write the data in a header of the data file.

Figure 1:
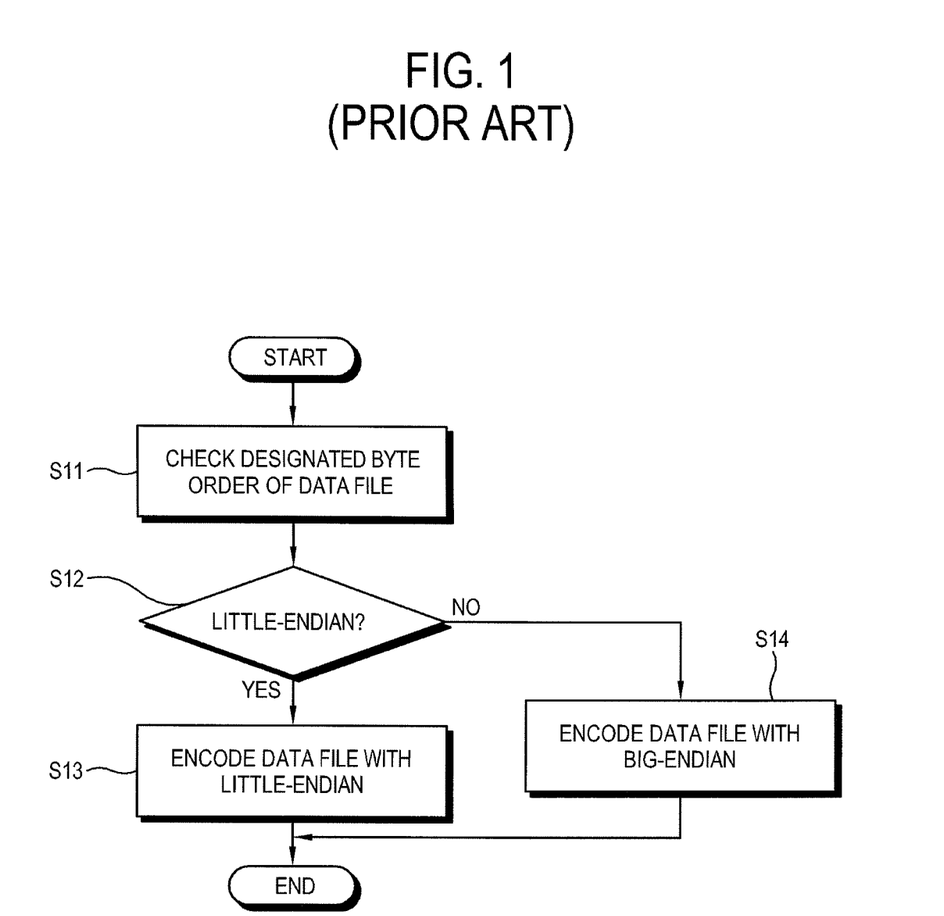
FIG. 1 is a flowchart illustrating a conventional method of encoding a data file.

More specifically, if the particular byte order is designated in writing the data file (hereinafter, writing data file will be called "encoding"), the computer system checks the preset byte order of the data file as shown in FIG. 1 (S11). If the preset byte order is little-endian (S12), the computer system encodes the data file with a little-endian form (S13). If the preset byte order is not little-endian at operation S12, the computer system encodes the data file with a big-endian form (S14).

Figure 2:
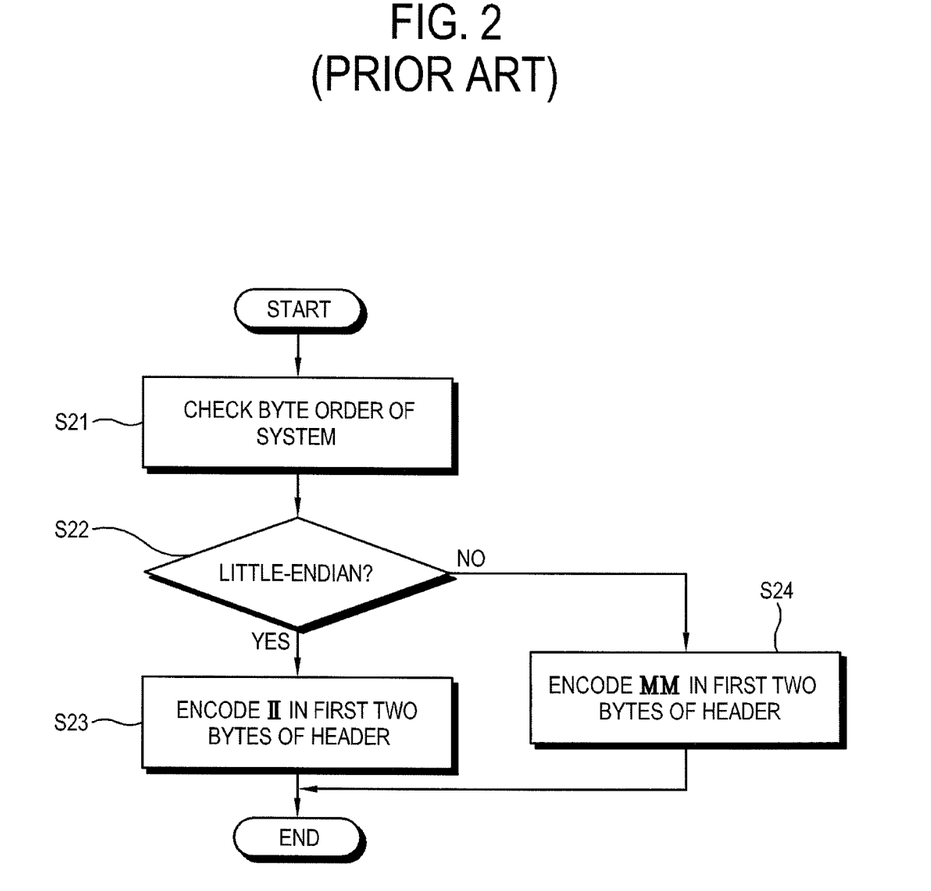
FIG. 2 is a flowchart illustrating a conventional method of encoding a data file.

Meanwhile, if the byte order is written in the header of the data file, the computer system checks the byte order of its own as shown in FIG. 2 (S21). If the byte order of the computer system is little-endian (S22), the computer system writes 11 in the first two bytes in the header of the data file (S23). If the byte order of the computer system is not little-endian at operation S12, the computer system writes MM in the first two bytes in the header of the data file (S24).

Figure 3:
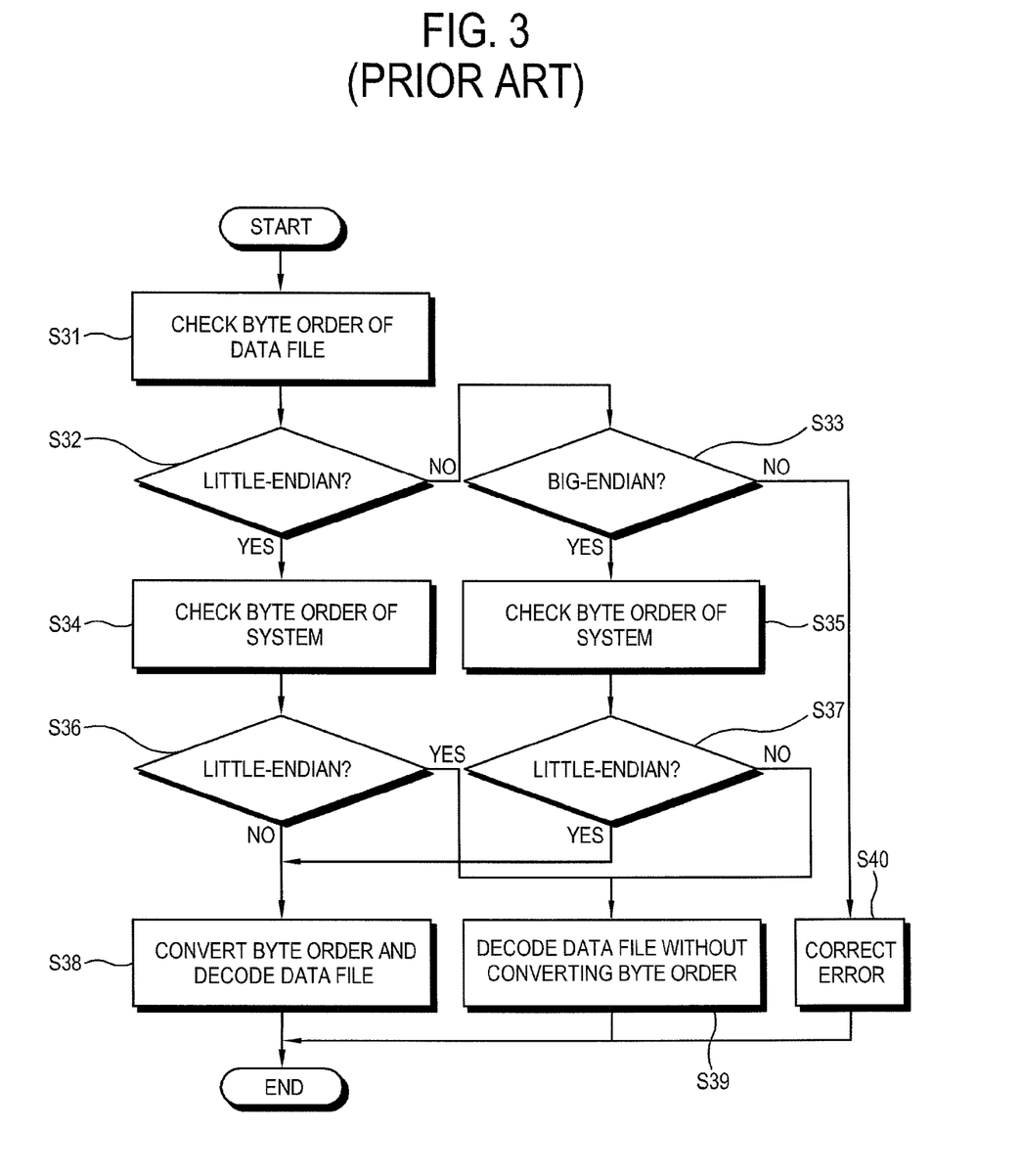
FIG. 3 is a flowchart illustrating a conventional method of decoding a data file.

To read the data file (hereinafter, to be called "decoding") as encoded above two cases, the computer system checks the byte order of the data file in both the big-endian and little-endian forms, as shown in FIG. 3 (S31). At operation S31, if the particular byte order is designated by the file format, the computer system checks the designated byte order. If the byte order is written in the header of the data file, the computer system decodes the first two bytes of the header at a time and determines whether it is II or MM.

If it is determined at operation S31 that the byte order of the data file is little-endian (S32), the computer system checks the byte order of its own (S34). If it is determined at operation S34 that the byte order of the computer system is little-endian (S36), the computer system decodes the data file without converting the byte order of the data file (S39). If it is determined at operation S34 that the byte order of the computer system is not little-endian (S36), the computer system converts the byte order of the data file into big-endian and decodes the data file (S38).

If it is determined at operation S31 that the byte order of the data file is not little-endian (S32), the computer system checks whether the byte order of the data file is big-endian (S33). If the byte order of the data file is not big-endian, the computer system detects and processes as an error (S40).

If it is determined at operation S31 that the byte order of the data file is big-endian (S33), the computer system checks the byte order of its own (S35). If determined at operation S35 that the byte order of the computer system is little-endian (S36), the computer system converts the byte order of the data file into little-endian and decodes the data file (S38). If the byte order of the computer system is not little-endian, the computer system decodes the data file without converting the byte order of the data file (S39).

As described above, the conventional invention checks the byte order of the data file or the system byte order to encode the data file with the system. Also, the conventional invention checks the byte order of both the data file and the system to decode the data file.

As the conventional invention always checks the byte order of the data file and/or the computer system, the data is not processed efficiently.

Also, as the conventional invention checks the byte order of the computer system, a program should be developed corresponding to respective computer systems, which is very inefficient.

SUMMARY OF THE INVENTION

The present general inventive concept provides a data processing apparatus and a data processing method which efficiently processes a byte order of a data file.

The present general inventive concept also provides a data processing apparatus and a data processing method which improves processing of a byte order of a data file to enhance efficiency in programming.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept can be achieved by providing a data processing method, including reading order information included in a data file according to one of a pair of byte orders, comparing the read order information with preset reference information, and decoding the data file if the order information is equal to the reference information.

The decoding the data file may include decoding the data file by converting the byte order of the data file if the order information is not equal to the reference information.

The pair of byte orders may include little-endian and big-endian.

The order information and the reference information may include hexadecimal values of two or more bytes which are different with each other.

The data processing method may further include determining that the data file is encoded with the big-endian if a first byte of the order information is equal to the most significant byte of the reference information, and determining that the data file is encoded with the little-endian if the first byte of the order information is equal to the least significant byte of the reference information.

The data processing method may further include displaying the determined endian.

The order information may be included in a header of the data file.

The foregoing and/or other aspects of the present general inventive concept can also be achieved by providing a data processing apparatus, including: a memory which stores a data file which is encoded in one of a pair of byte orders and includes order information on the byte order, and a processor which compares the order information stored in the memory with preset reference information, and decodes the data file if the order information is equal to the reference information.

The processor may convert the byte order of the data file and decodes the data file if the order information is not equal to the reference information.

The pair of byte orders may include little-endian and big-endian.

The order information and the reference information may include hexadecimal values of two or more bytes which are different with each other.

The processor determines that the data file may be encoded with the big-endian if a first byte of the order information is equal to the most significant byte of the reference information, and determines that the data file is encoded with the little-endian if the first byte of the order information is equal to the least significant byte of the reference information.

The data processing apparatus may further include a display unit, wherein the processor displays the determined endian on the display unit.

The order information may be included in a header of the data file.

The foregoing and/or other aspects of the present general inventive concept can also be achieved by providing a computer-readable medium to contain computer-readable codes an a program to execute a method of a data processing apparatus, the method including reading order information included in a data file according to one of a pair of byte orders, comparing the read order information with preset reference information, and decoding the data file if the order information is equal to the reference information.

The foregoing and/or other aspects of the present general inventive concept can also be achieved by providing a data processing apparatus, including a memory to store a data file, and a processor to read the data file from the memory, and to decode the data file according to information on a byte order of the read data file and a reference byte order.

The memory may store the data file according to one of big-endian and little-endian, and the reference byte order may represent a first byte order to correspond to the one of the big-endian and the little-endian, and a second byte order to correspond to the other one of the big-endian and the little-endian.

The reference byte order may include an order of a first byte and a second byte in a first address and a second address of the memory, respectively.

The data file may include a header and data, and the information on the byte order may be included in the header of the data file.

The header may include a first byte and a second byte, and the information on the byte order may include information on a predetermined first byte in the first byte of the header and a second predetermined byte in the second byte of the header.

BRIEF DESCRIPTION OF THE DRAWINGS

The above and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
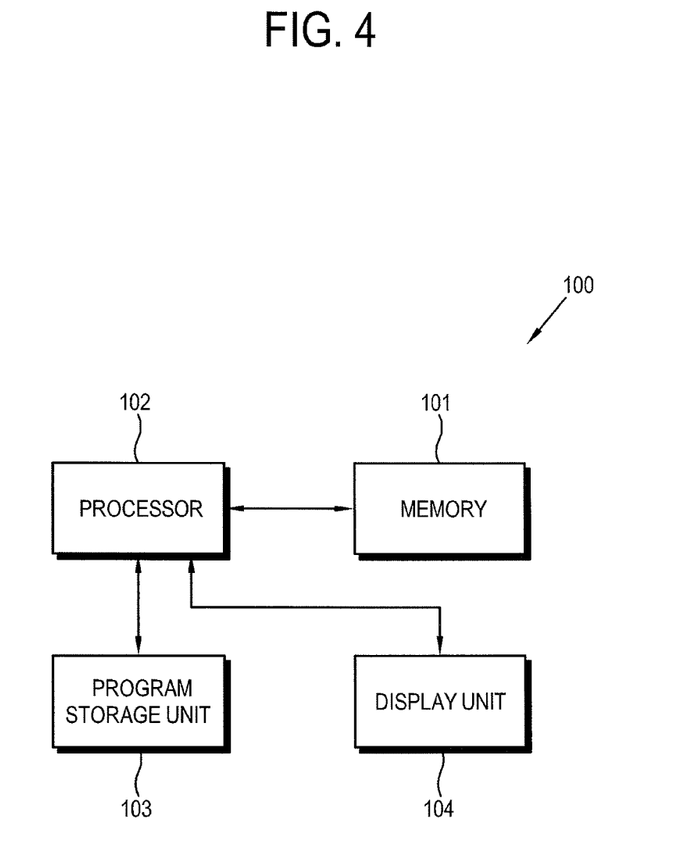
FIG. 4 is a block diagram illustrating a data processing apparatus according to an exemplary embodiment of the present general inventive concept.

FIG. 4 is a block diagram illustrating a data processing apparatus 100 according to an exemplary embodiment of the present general inventive concept. The data processing apparatus (hereinafter, to be called "system") 100 includes a memory 101 which stores data therein, and a processor 102 which reads the data stored in the memory 101, processes the read data, and encodes data to the memory 101.

When the processor 102 encodes the data to the memory 101, the processor 103 converts (encodes) the data of a decimal system into the data of a binary system and stores the converted data of the binary system in the memory 101 according to designated addresses. When the processor 102 decodes the data from the memory 101, the processor 103 reads the data from the memory 101 and converts the read data of the binary system into the data of the decimal system.

The memory 101 may include a random access memory (RAM) while the processor 102 may include a central processing unit (CPU). The data processing apparatus 100 may be embodied as a general purpose computer system such as a personal computer (PC), an embedded system such as a printer, etc. The data which is stored in the memory 101 may be a file format (hereinafter, such data to be called "data file"). When the data processing apparatus 100 is the printer, the data processing apparatus 10 may include a conventional image forming unit to form an image on a print medium according to the data file. When the data processing apparatus 100 is the PC, the data processing apparatus may include an interface to communicate with the printer to transmit the data file to the printer.

The processor 102 may encode the data file to the memory 101 or decode the data file from the memory 101 in a byte unit (e.g., 2 bytes in a case of 16-bits). The processor 102 may have a byte order (or endianness) to encode and decode the data file with respect to the memory address. For example, the byte order of the processor 102 may be big-endian or little-endian.

The data processing apparatus 100 according to the exemplary embodiment of the present general inventive concept does not need to check the byte order of the system or the data file to encode and/or decode the data file to and from the memory 101. Instead, the data processing apparatus 100 writes particular information to the data file, and checks whether the particular information is the same as pre-written particular information (previously stored reference information) when decoding.

More specifically, if encoding in a system using little-endian, e.g., "0X5678" is encoded, "0X78" and "0X56" are encoded to the first byte and the second byte of the binary system, respectively, according to the physical memory address order, that is, a sequential order of the first address and the second address of the memory 101. Here, 0X represents hexadecimal notation. If the data encoded in little-endian system is decoded by the same little-endian system, "0X5678" is decoded as it is. That is, the system may use and decode the data file without a change in the data file.

Meanwhile, if the data encoded with little-endian is decoded with a system using big-endian, which is a different byte order, the data is decoded as "0X7856". In this case, the byte order of the data file has to be converted to use the correct value of the data file, and a conversion is also necessary for little-endian encoded data to be read in a system using big-endian byte order.

If encoding in a system using big-endian, e.g., "0X5678" is encoded, "0X56" and "0X78" are encoded to the first byte and the second byte of the binary system, respectively, according to the physical memory address order, that is, a sequential order of the first address and the second address of the memory 101. Here, 0X represents hexadecimal notation. If the data encoded in a big-endian system is decoded by the same big-endian system, "0X5678" is decoded as it is. That is, the system may use and decode the data file without a change in the data file.

If the data encoded with big-endian is decoded with a system using little-endian, which is a different byte order, the data is decoded as "0X7856". In this case, the byte order of the data file has to be converted to use the correct value of the data file, and a conversion is also necessary for a big-endian encoded data to be read in a system using little-endian byte order.

Hereinafter, the data processing apparatus 100 according to the exemplary embodiment of the present general inventive concept employing the foregoing principle will be described in more detail.

Figure 5:
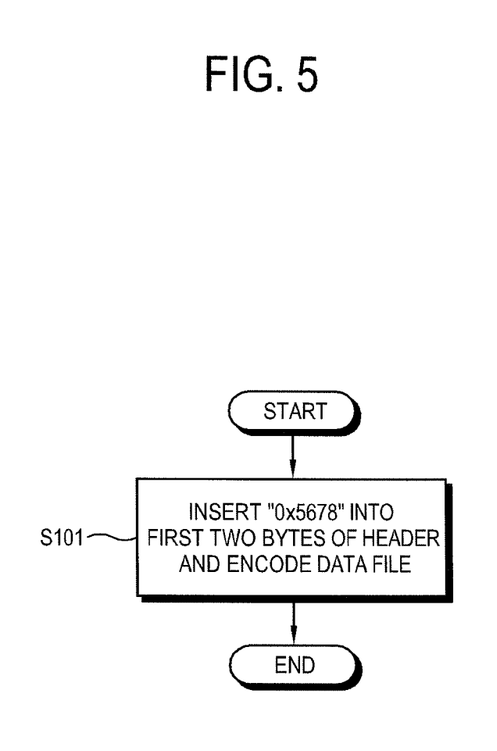
FIG. 5 is a flowchart illustrating a method of encoding a data file in a data processing apparatus according to an exemplary embodiment of the present general inventive concept.
Figure 7:
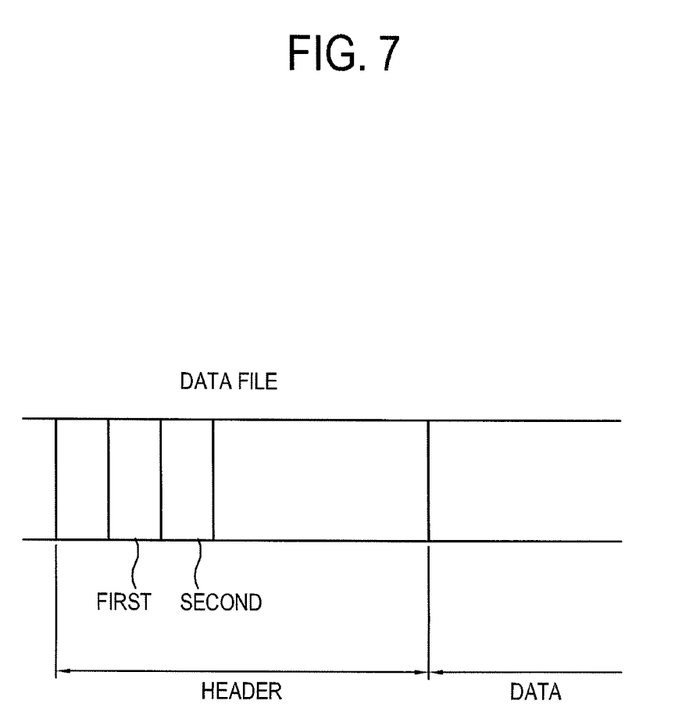
FIG. 7 is a view illustrating a data file useable with the data processing apparatus of FIG. 4 and the data processing method of FIGS. 5 and 6 according to an exemplary embodiment of the present general inventive concept; and, FIG. 8 is a flowchart illustrating a method of decoding a data file in a data processing apparatus according to an exemplary embodiment of the present general inventive concept.

The processor 102 inserts preset order information into the data file to write the data file to the memory 101, i.e., to encode the data file. The order information may include a hexadecimal value with two or more different bytes. For example, the hexadecimal value may be "0X5678." The order information may be set in the first two bytes of a header of the data file as illustrated in FIG. 7. The data file can include at least a header section and a data section. The header section is referred to as the header to include the first byte and the second byte to correspond to the first address and the second address according to a predetermined byte order. The encoding operation S101 of the data processing apparatus 100 according to the exemplary embodiment of the present general inventive concept is illustrated in FIG. 5.

Meanwhile, the processor 102 compares the order information of the data file stored in the memory 101 with preset reference information to read the data file from the memory 101, i.e., to decode the data file. If the order information is same with the reference information, the processor 102 decodes the data file without converting the byte order. If the order information is not same with the reference information, the processor 102 converts the byte order of the data file and decodes the data file.

The reference information may represent, for example, "0X78" and "0X56" of "0X5678" to correspond to the first byte and the second byte according to the sequential order of the first address and the second address of the memory 101 when the data is encoded in little-endian system, and "0X56" and "0X78" of "0X5678" to correspond to the first byte and the second byte according to the sequential order of the first address and the second address of the memory 101 when the data is encoded in big-endian system.

The reference information is identical to the order information and may be a hexadecimal value with two or more different bytes. For example, if the order information is "0X5678", the reference information may be also "0X5678". The reference information is stored in advance. As illustrated in FIG. 4, the data processing apparatus 100 may further include a program storage unit 103 to store the reference information therein. The program storage unit 103 may include a nonvolatile memory such as a read only memory (ROM).

Figure 6:
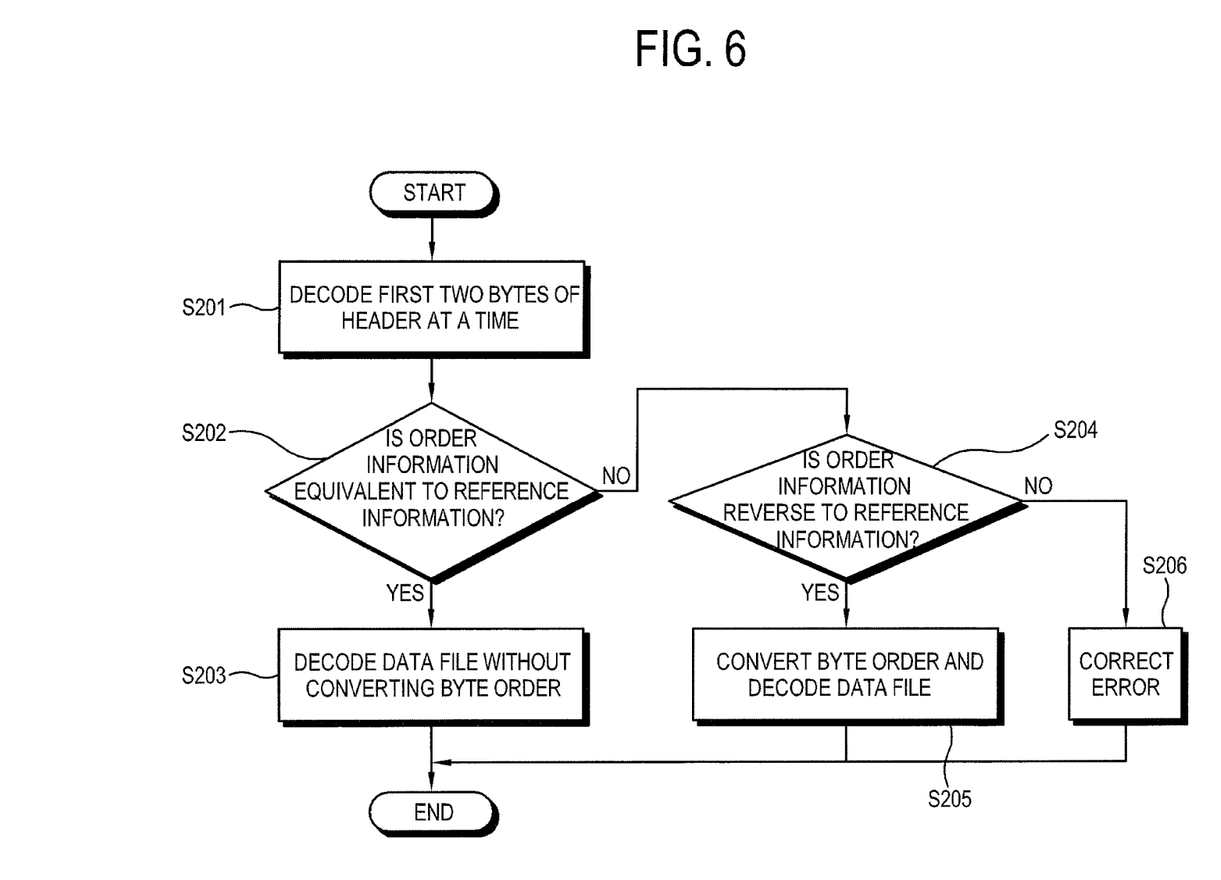
FIG. 6 is a flowchart illustrating a method of decoding a data file in a data processing apparatus according to an exemplary embodiment of the present general inventive concept.

FIG. 6 is a flowchart which illustrating a method of decoding the data processing apparatus 100 according to the present general inventive concept referring to FIG. 6, the processor 102 decodes the first two bytes of the header as the order information of the data file stored in the memory 101 at a same time at operation S201.

The processor 102 compares the decoded first two bytes of the header with the preset reference information to determine whether they are equal at operations S202 and S204). If the decoded first two bytes of the header are equal to the reference information at operation S202, the processor 102 decodes the data file without converting the byte order of the data file at operation S203.

If the decoded first two bytes of the header are not equal to the reference information at operation S202, the processor 102 determines whether the first two bytes of the header are reverse to the two bytes of the reference information at operation S204. At operation S204, for example, the first two bytes of the header may be decoded as "0X7856" while the hexadecimal value of the reference information is "0X5678," or may be decoded as "0X5678 with the reference information "0X7856." In this case, the encoded data file and the system have the different byte order. If it is determined at operation S204 that the reversed first two bytes of the header is same to the two bytes of the reference information, the processor 102 converts the byte order of the data file into the other byte order and decodes the data file at operation S205. At operation S205, the byte order of the data file may be converted into the big-endian if the data file is encoded with little-endian and the system is big-endian. If the byte order of the data file is encoded with big-endian and the system is little-endian, the byte order of the data file may be converted into the little-endian. If it is determined at operation S204 that the reversed first two bytes of the header is not equal to the two bytes of the reference information, the processor 102 detects and processes as an error at operation S206. In this case, the order information and the reference information may not be preset as the equal value.

Figure 8:
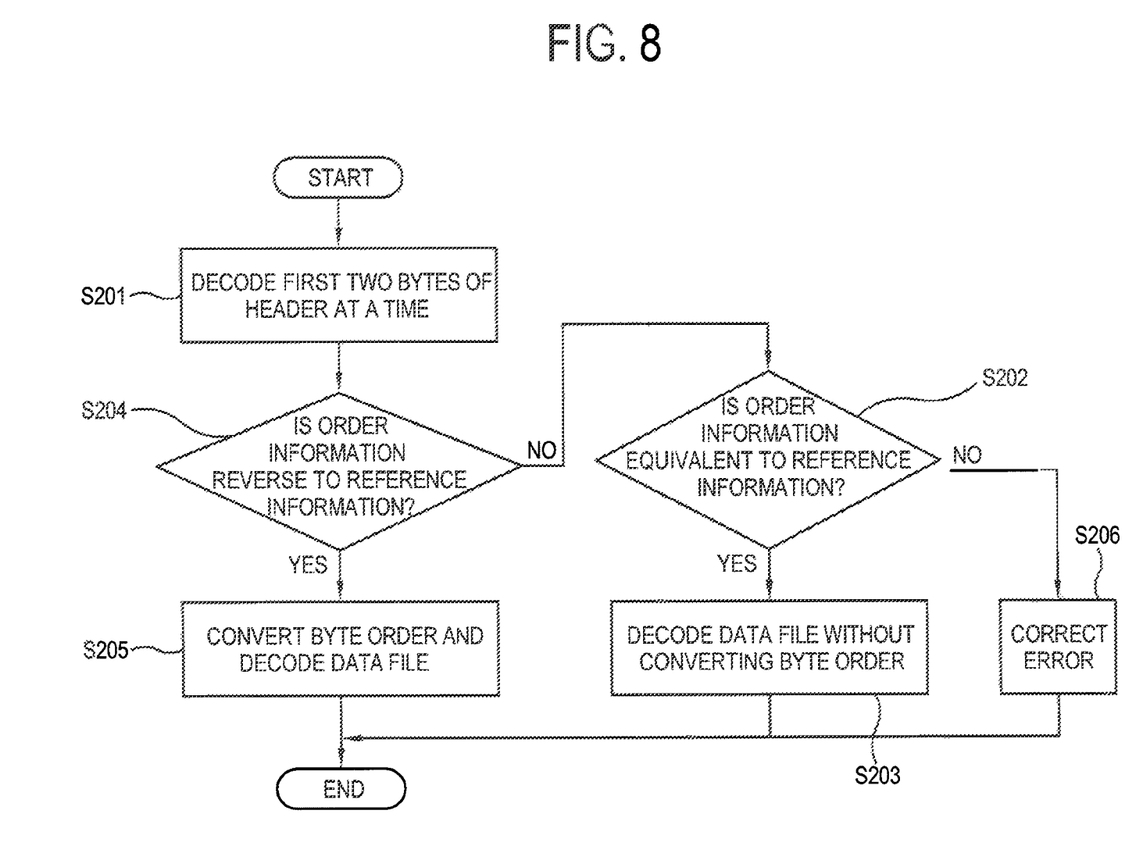

FIG. 8 is a flowchart which illustrating a method of decoding the data processing apparatus 100 according to the present general inventive concept. FIG. 8 illustrates operations S201, S202, S203, S204, S205, and S206, which are the same as described above with respect to FIG. 6. However, FIG. 8 illustrates that operation S204 is performed prior to operation S202.

Returning back to FIG. 4, the processor 102 according to the exemplary embodiment of the present general inventive concept may execute a program of codes in command unit. Such a program may be stored in the program storage unit 103. A part of or overall program stored in the program storage unit 103 is loaded onto the memory 101 and decoded by the processor 102 to be executed. The program includes codes with which the processor 102 performs operations as shown in FIGS. 4 to 6. In this case, the reference information may be included as a part of the codes.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the data processing apparatus 100 according to the exemplary embodiment of the present general inventive concept does not need to identify the byte order of the system and/or the data file to encode and decode the data. Thus, the system may encode and decode the data more efficiently.

Also, the byte order of the system is not necessary to be considered in system programming. Thus, a single program may apply to any systems regardless of the byte order of the systems, thereby improving efficiency in programming.

Without identifying the byte order of the system and/or the data file according to the exemplary embodiment of the present invention does not mean that the byte order of the data file cannot be identified. According to the exemplary embodiment of the present invention, the byte order of the data file may be identified comparing the first byte of the two or more bytes of the order information with the most significant byte, i.e., "0X56" or the least significant byte, i.e., "0X78" of the reference information "0X5678. For example, if the first byte of the order information is "0X56," it is encoded with the big-endian system. If the first byte of the order information is "0X78," it is encoded with the little-endian system.

The endianness (byte order) which is determined as described above, may be displayed on a display unit 104 of FIG. 4. The display unit 104 may be included in the data processing apparatus 100, and may include a liquid crystal display (LCD) panel which is controlled by the processor 102.

The processor 102 can generate a signal as an interface to represent an image of the endianness (byte order) to be displayed on the display unit 104.

As described above, the present general inventive concept provides a data processing apparatus and a data processing method which encodes and decodes data more efficiently since it does not need to identify a byte order of a system and/or a data file.

Also, the present general inventive concept provides a data processing apparatus and a data processing method which improves efficiency in programming since a byte order of a system is not necessary to be identified and a single program can be applied to any systems regardless of the byte order of the systems.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A data processing method, comprising:
    reading order information included in a data file, the data file being encoded according to one of little-endian byte ordering and big-endian byte ordering;
    determining if the read order information is reverse of preset reference information; and
    decoding the data file after converting the byte order of the data file if the read order information is reverse of the preset reference information.

2. The data processing method of claim 1, further comprising:
    determining if the read order information is equal to the preset reference information; and
    decoding the data file without converting the byte order of the data file if the read order information is equal to the preset reference information.

3. The data processing method of claim 2, wherein the order information and the preset reference information comprise hexadecimal values of two or more bytes, wherein the two or more bytes are different from each other.

4. The data processing method of claim 3, further comprising:
    determining that the data file is encoded with the big-endian byte ordering if a first byte of the order information is equal to the most significant byte of the reference information; and
    determining that the data file is encoded with the little-endian byte ordering if the first byte of the order information is equal to the least significant byte of the reference information.

5. The data processing method of claim 4, further comprising:
    displaying the determined byte ordering.

6. The data processing method of claim 1, wherein the order information is included in a header of the data file.

7. A data processing apparatus, comprising:
a memory to store a data file which is encoded according to one of a little-endian byte ordering and a big-endian byte ordering, the data file comprising order information; and
a processor to read the order information included in the data file, to determine if the read order information is reverse of preset reference information, and to decode the data file after converting the byte order of the data file if the read order information is reverse of the preset reference information.

8. The data processing apparatus of claim 7, wherein the processor determines if the read order information is equal to the preset reference information and decodes the data file without converting the byte order of the data file if the read order information is equal to the preset reference information.

9. The data processing apparatus of claim 8, wherein the order information and the reference information comprise hexadecimal values of two or more bytes, wherein the two or more bytes are different from each other.

10. The data processing apparatus of claim 9, wherein the processor determines that the data file is encoded with the big-endian byte ordering if a first byte of the order information is equal to the most significant byte of the reference information, and determines that the data file is encoded with the little-endian byte ordering if the first byte of the order information is equal to the least significant byte of the reference information.

11. The data processing apparatus of claim 10, further comprising:
a display unit,
wherein the processor displays the determined byte ordering on the display unit.

12. The data processing apparatus according to claim 7, wherein the order information is included in a header of the data file.

13. A data processing apparatus, comprising:
a memory to store a data file; and
a processor to read information on a byte order of the stored data file from the stored data file, to compare a sequential order of bytes of the read information to a sequential order of bytes of a reference byte order, and to decode the data file after converting the byte order of the data file if the read order information is reverse of preset reference information according to a result of the comparison.

14. The data processing apparatus of claim 13, wherein the memory stores the data file according to one of a big-endian byte ordering and a little-endian byte ordering, and the reference byte order represents a first byte order to correspond to the one of the big-endian byte ordering and the little-endian byte ordering, and a second byte order to correspond to the other one of the big-endian byte ordering and the little-endian byte ordering.

15. The data processing apparatus of claim 13, wherein the reference byte order comprises a first byte and a second byte in a first address and a second address of the memory, respectively.

16. The data processing apparatus of claim 13, wherein the data file comprises a header and data, and the information on the byte order are included in the header of the data file.

17. The data processing apparatus of claim 16, wherein:
the header comprises a first byte and a second byte; and
the information on the byte order comprises information on a predetermined first byte in the first byte of the header and a second predetermined byte in the second byte of the header.

18. A data processing method, comprising:
decoding order information as a first two bytes included in a data file, the data file being encoded according to one of a pair of byte orders;
determining a relation between an order of bytes of the decoded order information with an order of bytes of a reference information; and
decoding the data file after converting the byte order of the data file if the read order information is reverse of the preset reference information according to the determined relation.

19. The data processing method of claim 18, wherein the decoding the data file further comprises decoding the data file after converting the byte order of the data file if the determined relation is not equal.

20. The data processing method of claim 19, wherein the decoding the data file further comprises decoding the data file without converting the byte order of the data file if the determined relation is equal.

21. The data processing method of claim 18, wherein the decoding the data file further comprises decoding the data file by converting the byte order of the data file when the determined relation is reverse.

22. A data processing method comprising:
reading order information included in a data file, the data file being encoded according to one of little-endian byte ordering and big-endian byte ordering;
determining if the read order information is equivalent to preset reference information or not;
decoding the data file without converting the byte order of the data file if the read order information is equivalent to the preset reference information; and
decoding the data file after converting the byte order of the data file if the read order information is not equivalent to the preset reference information.

* * * * *